3,597,396
STABILIZATION OF POLYOXYMETHYLENES
Jacob Ackermann, Pierino Radici, and Giorgio Anessi, Milan, Italy, assignors to Società Italiana Resines S.p.A., Milan, Italy
Filed July 25, 1968, Ser. No. 747,732
Claims priority, application Italy, Aug. 1, 1967, 19,064/67
Int. Cl. C08g 1/24
U.S. Cl. 260—67                                                                    7 Claims

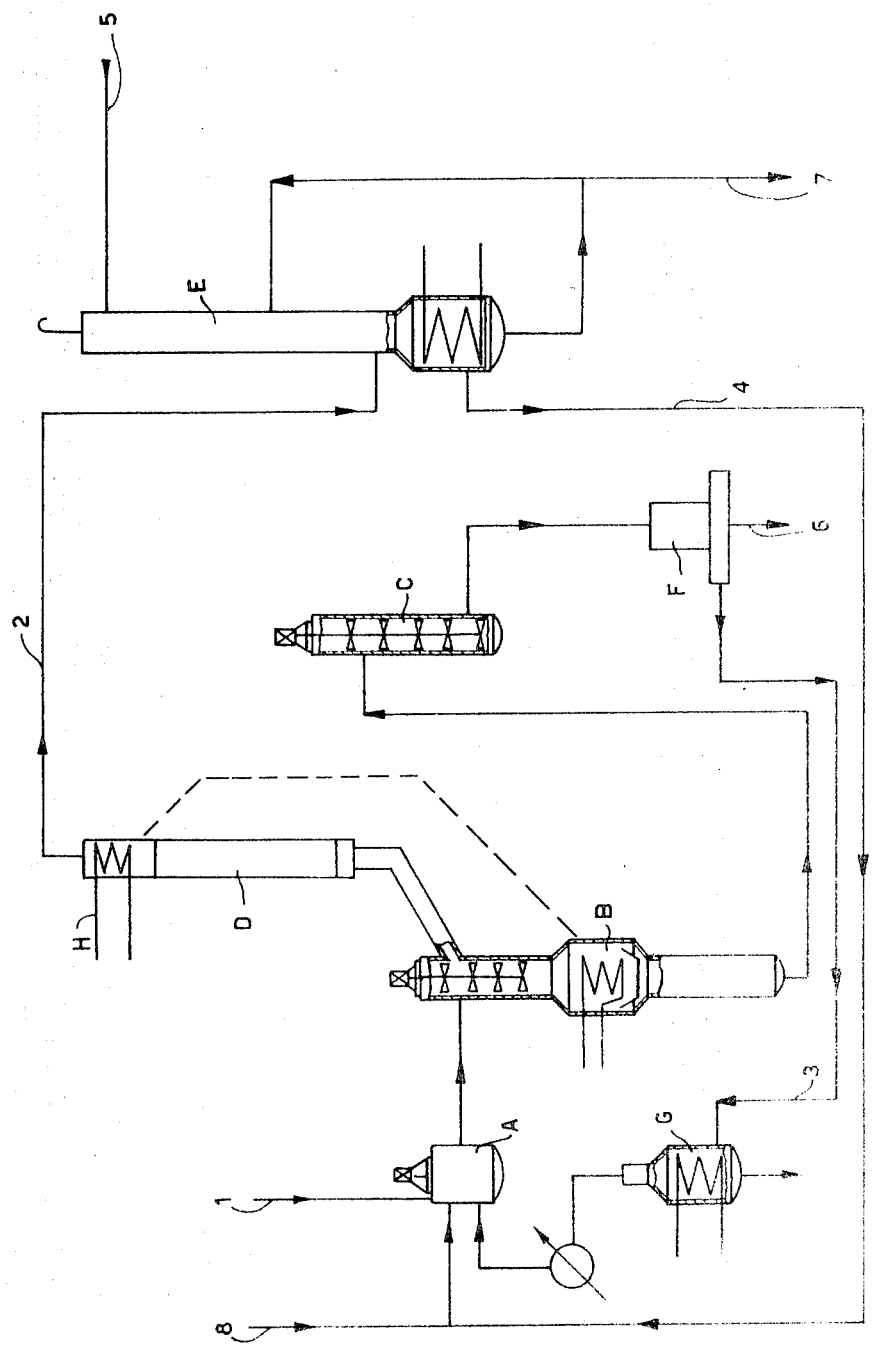

ABSTRACT OF THE DISCLOSURE

Monomeric formaldehyde evolving during stabilization of a polyoxymethylene by means of a reagent blocking the terminal groups of the latter is recovered by carrying out the stabilization reaction in an inert, water-immiscible solvent, at boiling temperature of the mixture, the boiling point of the solvent being lower than that of the reagent, and the boiling temperature of the mixture being in excess of the temperature at which formaldehyde would polymerize; the evolved vapours are rectified to recover formaldehyde.

---

The present invention relates to an improved method of stabilizing high polymers of formaldehyde, more particularly to a process by which the polymers are made thermally and chemically stable by blocking, especially by esterification, the terminal groups of the macromolecules so as to make such products useful for manufacturing thermoplastic resins known by the name of polyacetals, and for the manufacture of fibers, films and the like.

It is known that raw polymers of high molecular weight obtained by polymerization or co-polymerization of formaldehyde or its cyclic trimer contain at least one hydroxyl group to each macromolecule, which makes the prouct thermally unstable so that, in order to avoid depolymerization, the said hydroxyl groups are usually esterified.

The esterification is carried out by means of the anhydrides of carboxylic acids, usually by means of the anhydride of acetic acid, generally in the presence of substances capable of accelerating the esterification reaction, such as for instance pyridine, tertiary amines or salts of carboxylic acids. Substances may further be present which prevent or control dissociation of the polymeric chains which, as is well known, leads to the formation of polymers lower than the average molecular weight.

In usual techniques the esterification of the terminal groups of the polyoxymethylenes by reaction with anhydrides of carboxylic acids, more particularly by means of acetic anhydride, is carried out at temperatures exceeding about 120° C., preferably at temperatures at which the polymer is dissolved in the liquid esterifying agent. It is known that esterification will be better completed by operating in a homogeneous medium.

However, it is known that under the conditions of the esterification reaction, degradation of polyoxymethylene occur, which sets free monomeric formaldehyde from the terminal groups of the macromolecules, this process being more accentuated as the reaction temperature is increased.

This degradation is moreover strongly accelerated by the carboxylic acid present in the reaction medium either as an impurity in the anhydride or owing to the water set free during esterification, or degradation of the anhydride itself.

Even by operating the esterification process in the presence of accelerating substances and/or in the range of temperatures in which the ratio of the esterification and degradation rates is more favourable, the process, though attempted, cannot be fully eliminated.

As a consequence, monomeric formaldehyde is set free, which should be recovered in as pure a form as possible for economy of the process, in order to utilize it for further use.

However, it is known that monomeric formaldehyde evolved as a result of degradation processes partly reacts in the liquid phase and forms undesirable side products. For instance, where the acetic anhydride is employed as an esterifying agent, diacetate of methylenglycol chiefly forms.

A co-pending United States application No. 747,430 filed July 25, 1968 of the applicants describes a process by which the formation of side products can be substantially avoided during esterification of the polyoxymethylenes in a process in which the raw polymer is esterified in suspension or, better, in solution at a temperature preferably ranging between 135 and 165° C. approximately.

This process essentially consists in carrying out the reaction in such manner that in the vapor phase, in balance with the liquid phase, there is a concentration of monomeric formaldehyde between 1 and 50% by weight with respect to the total weight of the vapors.

In actual practice this may be obtained by maintaining the mass at boiling point by adjusting the pressure and temperature so that at each stage of the reaction the composition of the vapor phase is within the desired limits.

In this manner the liquid reaction medium is deprived of undesirable side products, the vapor phase being substantially formed by the anhydride of the acid and the monomeric formaldehyde which should be recovered for economy of the process.

To this end, for instance, the vapors could be cooled in order to condense the anhydride and subsequently recover the formaldehyde such as by drenching with water. However, it is known that the temperature of the vapors cannot be lowered to values below about 100–120° C., in order to avoid the formation of polymers of formaldehyde which would foul the condenser and entail the risk of obstructions, or adversely effect the progress of reaction. However, on account of the high vapor pressure of the anhydride at the said temperature a considerable quantity of formaldehyde gas would be obtained in the anhydride.

On subsequent drenching with water the anhydride would be converted to carboxylic acid, forming contaminated Formalin, which would be useless. In any case the loss of variable products would make the process inconvenient from an economic point of view.

An object of the invention is therefore to provide a simple and economically convenient process for separating in a pure form the monomeric formaldehyde evolved during stabilization of polyoxymethylenes.

It has been found that this is possible when the reacting liquid mass, admixed with a solvent which is inert under reaction conditions, is maintained at its boiling point, the vapors set free from the reacting mass being suitably rectified.

It should be noted that the process according to the invention, though usually applied to the technique utilizing the anhydirde of acetic acid or of other carboxylic acids in order to block the unstable terminal groups of the polyoxymethylenes, can be employed also in stabilizing process utilizing other reagents, such as for instance epichloridrine and epibromohydrine. In this case also the evolved monomeric formaldehyde resulting from the degrading processes can be recovered in a pure form, moreover avoiding halogenhydrine losses.

The inert solvent, useful for the purposes of the invention, should be water insoluble and of a boiling point at operating pressure lower than the boiling point of the reagent employed for blocking the terminal groups of the polyoxymethylene, but higher than the temperatures at which formaldehyde polymerizes.

Finally it should not form an azeotropic mixture with the said reagent, whereas azeotropism with the free carboxylic acid is preferred, though not essential.

For instance, when the anhydirde of acetic acid is employed as an esterifying agent, toluene may be used as an inert solvent.

Rectification of the vapors evolved from the boiling reaction mass tends to separate at the top the inert solvent together with monomeric formaldehyde, and recover at the base the reagent employed for blocking the terminal groups of the polyoxymethylenes and part of the solvent, which mixture is returned to the reaction medium. It is thereby possible to recover the formaldehyde by separating the inert solvent by extraction with water, thereby obtaining Formalin in a substantially pure form, the said Formalin containing but few impurities. For instance, when acetic anhydride is employed as an esterifying agent the Formalin obtained by the process of the invention will contain only the small quantities of acetic acid present in the reaction medium. If desired, this acidity may be easily removed, such as by means of exchange resins.

It should be noted that, in other embodiments of the invention, suitable extension liquids may be employed instead of water, for instance, cyclohexanol may be employed as the liquid. In this case a mixture of cyclohexanolhemimethylal and inert solvent is obtained at the bottom of the knocking column.

In a further fractionation this mixture may be separated into inert solvent, which is recycled to the esterification process, and anhydrous hemimethylal. Pyrrolysis of the hemimethylal directly yields gaseous, pure formaldehyde suitable for obtaining polyformaldehyde of high molecular weight, or anhydrous trioxane by a process previously described by applicants.

Referring more particularly to the esterification of polyoxymethylenes by means of anhydrides of carboxylic acids, the process may be carried out either continuously or discontinuously, the polymer being preferably, but not necessarily, dissolved in the esterifying agent. In the preferred embodiment of the invention the latter is the anhydride of the acetic acid, though other anhydrides of carboxylic acids may be employed.

The weight ratio of anhydride to polymer may vary within wide limits such as from 1:3 to 30:1 or, in the preferred embodiment, from 1:1 to 15:1, the quantity of inert solvent preferably ranging between 5 and 1000% with respect to the anhydride of the carboxylic acid.

Various inert solvents are useful for the purposes of the invention, such as toluene, xylene, cumol, benzene, chlorobenzene, cyclohexane, butylacetate and the like.

The reaction may be carried out in the persence of any additive known in the art, such as esterification catalysts such as tertiary amines, pyridin and the salts of carboxylic acids.

Chain stabilizers may be employed in order to avoid the formation of polymer of an excessively low average weight.

Useful temperatures for the esterification of polyoxymethylenes may range between 80 and 180° C., the preferred embodiment operating at 135 to 165° C., this being the range within which the rate of esterification to degradation speed is most favourable.

In any case the temperature and pressure conditions are adjusted to cause the reacting mass to boil and, in the preferred embodiment, to provide in the vapor phase a concentration of monomeric formaldehyde of 1 to 50% by weight with respect to the total weight of the vapors.

The vapors evolved from the reaction medium are suitably fractionated in a tray-filled column or a column with a filler to obtain at the top the inert solvent and formaldehyde which are then separated by extracting with water in order to separate the formaldehyde from the water insoluble organic solvent. The reagent and part of the inert solvent are in any case recovered at the bottom of the rectification column and returned to the reaction medium.

EXAMPLE

The esterification of the raw polyformaldehyde is carried out continuously by the process of the invention. Referring to the accompanying FIG. 1, which is a block diagram, the raw polymer carrying at least one hydroxyl group to each macromolecule is charged through line 1 to a mixer A together with fresh reagent which is an acetic anhydride and toluene mixture (line 8) and recycled reagent (line 4). The intrinsic viscosity of the polymer amounts to 1.59.

The suspension obtained in the mixer A is then conveyed to reactor B in which the polymer is readily dissolved in the reagent by the effect of the temperature and stirring. The pressure in the reactor B is adjusted to establish a temperature of 152–150° C.

The vapors produced in the reactor B are rectified both in the rectification column D and in the top of the reactor B. More particularly, in the column D the acetic acid and toluene are concentrated, whereas in the rectifying portion of the reactor B removal of acetic acid only is actually effected. The acetic anhydride to toluene ratio of the reagent is 1:1, the polymer to reagent ratio being 1:8, both ratios being by weight.

Most of the vapors reaching the top of the column D are condensed by the condenser H which is kept at 110° C. to avoid fouling.

The top condensate contains over 95% toluene; the non-condensable gases, more particularly formaldehyde together with the toluene vapors and small quantities of anhydride and free acid are conveyed by line 2, heated to 120° C., to the extraction column E, where the formaldehyde and acid are dissolved in water and toluene condenses and separates at the bottom of the column as the upper layer. The lower aqueous layer is recycled as indicated in the diagram until the formaldehyde titrates 36% approximately. Water is supplied through line 5 in sufficient quantity to maintain the formaldehyde content at the desired value. Formalin is discharged through line 7. If desired, this Formalin may be suitably treated, such as by means of anionic exchange resins in order to remove fully acidity, while in certain cases it is usefully employed as such. The condensed toluene is discharged through line 4 and may be recycled.

The solution of the esterified polymer is cooled at C for precipitating. The resulting suspension is separated into reagent and acetylated polymer in a separator F. The yield of recovered polymer (line 6) amounts to 94%; the viscosity of the polymer is 1.65 and thermal degradation $K_{220}=0.01\%/\min$. The recovered reagent is conveyed through line 3 to evaporator G where the heavy and/or colored products are removed, such as catalyst residue, lubricating oils and diacetates of the polyoxymethyleneglycol of low molecular weight. The acetic anhydride loss by entraining in line 2 is very low. With respect to the stabilized polymer obtained at 6, 1.5% by weight approximately is lost.

By way of comparison a run is carried out according to the prior art, by employing pure anhydride and drawing the vapors evolved in the reactor B at the middle of the reactor and directly conveying them to the condenser H bypassing the rectifying portion (dash line in FIG. 1). The free acid content in the starting reagent, the raw polymer and the temperature in reactor B and condenser H are the same as in the above described run. In this case the ahydride loss due to entraining (line 2) amounts to 24%, the recovered polymer output being 88%. Moreover, the moisture in the recovered Formalin (line 7) is very high (over 100% with respect to formaldehyde) and should therefore be removed. The acetic acid content in line 3 is increased in this case by 0.4%, whereas it had remained constant in the previous example.

The removal of this acid would require fractionation (instead of simply the evaporator G) with an inherent further consumption of power and loss in product. The intrinsic viscosity and thermal degradation ($K_{220}$) of the polymer amount to 1.68 and 0.02%/min. respectively.

The intrinsic viscosity is determined at 60° C. at a concentration of 0.5 g./100 ml. of p-chlorophenol with 2% alphapinene. The thermal degradation is determined by heating a sample at 220° C. in nitrogen and determining the decrease in weight as a function of time.

What we claim is:

1. A process for continuously acetylating raw polyoxymethylene by reacting the terminal hydroxyl groups of the polyoxymethylene macromolecules with acetic acid anhydride, which comprises:
   (a) feeding raw polyoxymethylene, acetic acid anhydride and a substantially water insoluble, inert solvent to an acetylation reactor to form a reacting mass, said inert solvent:
      (i) having a boiling point, at the pressure at which acetylation is carried out, lower than the boiling point of acetic acid anhydride but higher than the boiling point at which monomeric formaldehyde polymerizes, and
      (ii) forming an azeotropic mixture with acetic acid but not forming an azeotropic mixture with acetic acid anhydride;
   (b) maintaining, in the feed to the acetylation reactor, the weight ratio of acetic acid anhydride to raw polyoxymethylene within the range 1:3 to 30:1 while maintaining the amount of inert solvent with respect to the amount of acetic acid anhydride within the range of 5 to 1,000%, by weight;
   (c) acetylating said raw polyoxymethylene while said raw polyoxymethylene is in the dissolved or suspended state at a temperature of 135 to 165° C. while adjusting the pressure of acetylation to cause the reacting mass to boil, thereby evolving vapors comprising acetic acid anhydride, inert solvent, monomeric formaldehyde and acetic acid;
   (d) rectifying the vapors evolving from the reacting mass to cause the acetic acid anhydride and a portion of the inert solvent to flow back to the acetylation reactor as a bottom rectification product, and separating therefrom, as a top vaporous rectification product, the remainder of said inert solvent, monomeric formaldehyde and acetic acid;
   (e) extracting, with water, the vapors comprising the top rectification product to thereby separate an aqueous phase comprising an aqueous formaldehyde solution and an organic phase comprising the inert solvent, and thereafter recovering said aqueous phase and recycling said organic phase to the acetylation reactor; and
   (f) recovering the acetylated polyoxymethylene from the acetylation reactor.

2. The process of claim 1 wherein said inert solvent is selected from the group consisting of toluene, xylene, cumol, benzene, chlorobenzene, cyclohexane and/or butylacetate.

3. The process of claim 1 wherein said inert solvent forms an azeotrope with said acetic acid which is formed during the reaction of said acetic acid anhydride with said raw polyoxymethylene, whereby said rectification provides a top vaporous rectification product comprising formaldehyde and an azeotrope of acetic acid with the inert solvent.

4. The process of claim 1 wherein the concentration of the vaporous formaldehyde in the vapors evolved from said reacting mass is maintained in the range of 1 to 50%, by weight, based on the total weight of the evolving vapors.

5. The process of claim 1 wherein the weight ratio of the acetic acid anhydride to the raw polyoxymethylene in step (d) is maintained within the range 1:1 to 15:1.

6. The process of claim 1 wherein said aqueous phase further contains the acetic acid initially carried in the top vaporous rectification product.

7. The process of claim 1 wherein said inert solvent is toluene.

References Cited
UNITED STATES PATENTS

| | | | |
|---|---|---|---|
| 2,079,789 | 5/1937 | Charles | 203—43 |
| 2,964,500 | 12/1960 | Jenkins et al. | 260—67 |
| 2,998,409 | 8/1961 | Nogare et al. | 260—67 |
| 3,125,551 | 3/1964 | Punderson | 260—67 |
| 3,351,614 | 11/1967 | Fiore et al. | 260—67 |
| 3,355,428 | 11/1967 | Boyer et al. | 260—67 |
| 3,406,151 | 10/1968 | Klinkmann et al. | 260—67 |

WILLIAM H. SHORT, Primary Examiner

L. M. PHYNES, Assistant Examiner

U.S. Cl. X.R.

203—43; 260—704